(12) United States Patent
Carnevali

(10) Patent No.: US 9,631,663 B2
(45) Date of Patent: Apr. 25, 2017

(54) SECURITY KNOB WITH THREADED MEMBER

(71) Applicant: Jeffrey D. Carnevali, Seattle, WA (US)

(72) Inventor: Jeffrey D. Carnevali, Seattle, WA (US)

( * ) Notice: Subject to any disclaimer, the term of this patent is extended or adjusted under 35 U.S.C. 154(b) by 0 days.

(21) Appl. No.: 14/562,501

(22) Filed: Dec. 5, 2014

(65) Prior Publication Data

US 2016/0160529 A1  Jun. 9, 2016

(51) Int. Cl.
| F16B 41/00 | (2006.01) |
| F16B 39/12 | (2006.01) |
| F16B 37/14 | (2006.01) |
| F16B 23/00 | (2006.01) |

(52) U.S. Cl.
CPC .............. *F16B 39/12* (2013.01); *F16B 37/14* (2013.01); *F16B 41/005* (2013.01); *F16B 23/003* (2013.01)

(58) Field of Classification Search
CPC ............ Y10T 70/5854; Y10T 70/5858; Y10T 70/5863; Y10T 70/5867; E05B 73/007; E05B 73/0076; F16B 41/00; F16B 41/002; F16B 41/005; F16B 41/007; F16B 39/12; F16B 39/126
USPC .................................................. 70/229–232
See application file for complete search history.

(56) References Cited

U.S. PATENT DOCUMENTS

| 1,447,564 A * | 3/1923 | Norlund .............. F16B 23/0061 70/260 |
| 2,708,844 A * | 5/1955 | Cincel ..................... B60C 29/06 70/259 |
| 3,519,979 A * | 7/1970 | Bodenstein ........... F16B 41/005 70/404 |
| 4,302,137 A * | 11/1981 | Hart ..................... F16B 23/0069 70/231 |
| 4,742,702 A * | 5/1988 | Swertz ................ F16B 23/0069 70/232 |
| 5,097,686 A * | 3/1992 | Plumer ................. F16B 41/005 70/232 |
| 5,112,176 A * | 5/1992 | McCauley ............ F16B 41/005 411/432 |
| 5,863,166 A * | 1/1999 | Young .................... B62H 5/001 301/5.1 |
| 6,305,890 B1 * | 10/2001 | Okamura .............. F16B 41/005 411/372.5 |

(Continued)

*Primary Examiner* — Christopher Boswell
(74) *Attorney, Agent, or Firm* — Charles J. Rupnick

(57) ABSTRACT

A threaded security knob formed of a threaded member having a generally concentric body defining a central longitudinal axis, the body formed with a threaded portion along the central axis adjacent to a first end thereof, and a key receiver formed in a second end of the body opposite of the threaded portion, wherein the key receiver is formed having one of a plurality of different key receiver configurations; a slip ring having a generally tubular interior side wall sized to fit over and extend along the body of the threaded member in an inseverable and a relatively concentrically rotational relationship therewith; an interlocking rotational slip mechanism coupled between the threaded member and the slip ring; and a key formed with one of a plurality of different key configurations each corresponding to a different one of the plurality of different key receiver configurations of the key receiver.

29 Claims, 11 Drawing Sheets

(56) References Cited

U.S. PATENT DOCUMENTS

| | | | | |
|---|---|---|---|---|
| 6,609,401 B1 * | 8/2003 | Iskhakbayev | ......... | F16B 41/005 70/232 |
| 6,910,355 B2 * | 6/2005 | Swanson | ............... | F16B 41/005 70/232 |
| 8,888,430 B2 * | 11/2014 | Groppo | ................ | F16B 41/005 70/231 |
| 2012/0240640 A1 * | 9/2012 | Diaz | .................... | F16B 41/005 70/58 |

* cited by examiner

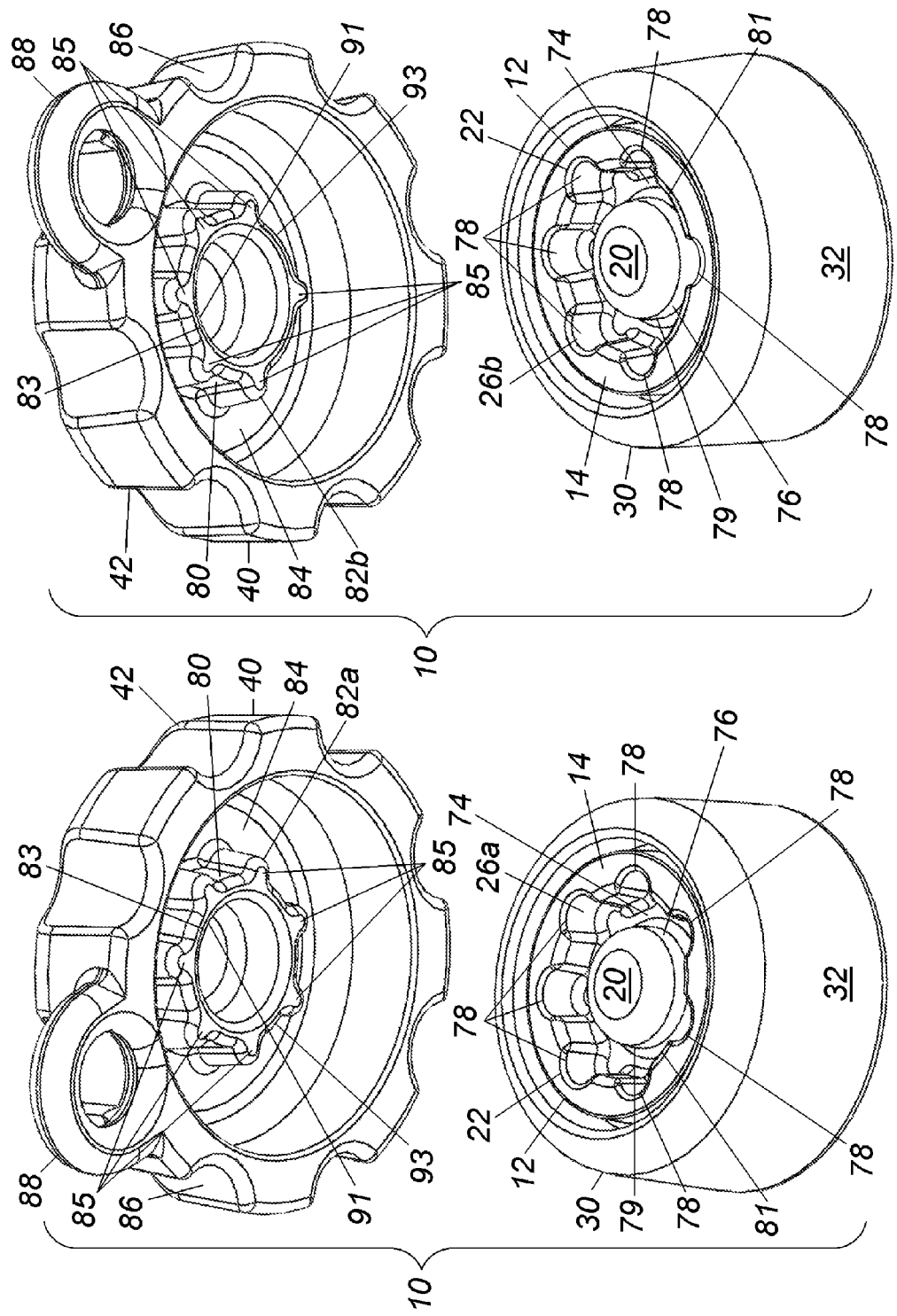

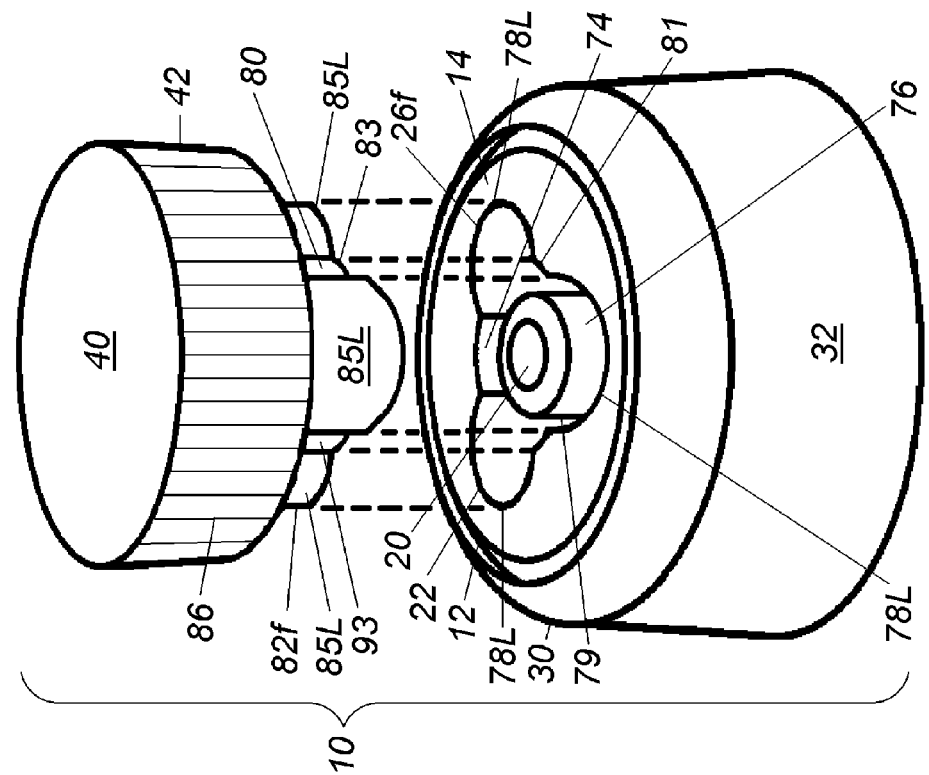
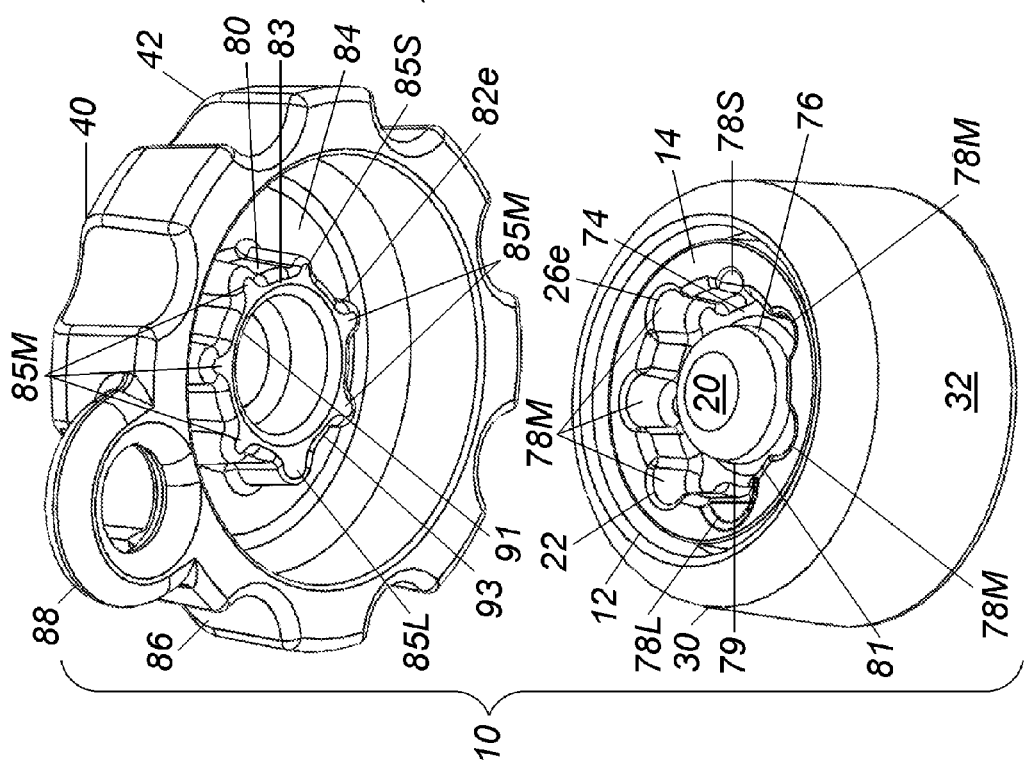
Fig. 15
Fig. 14

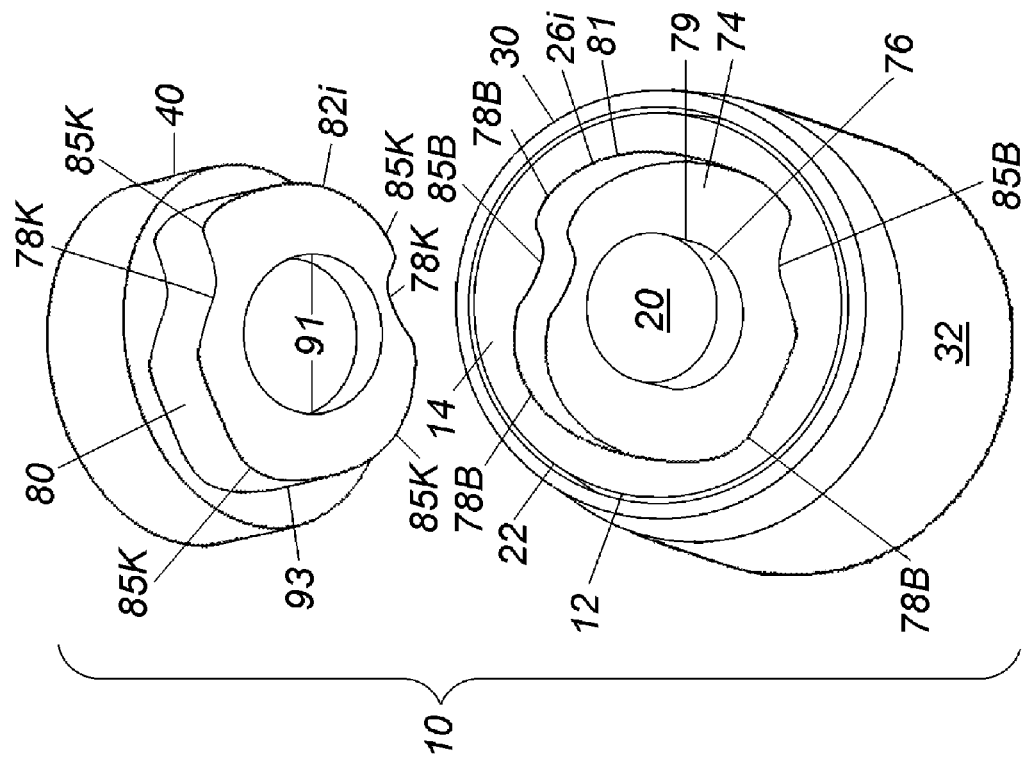
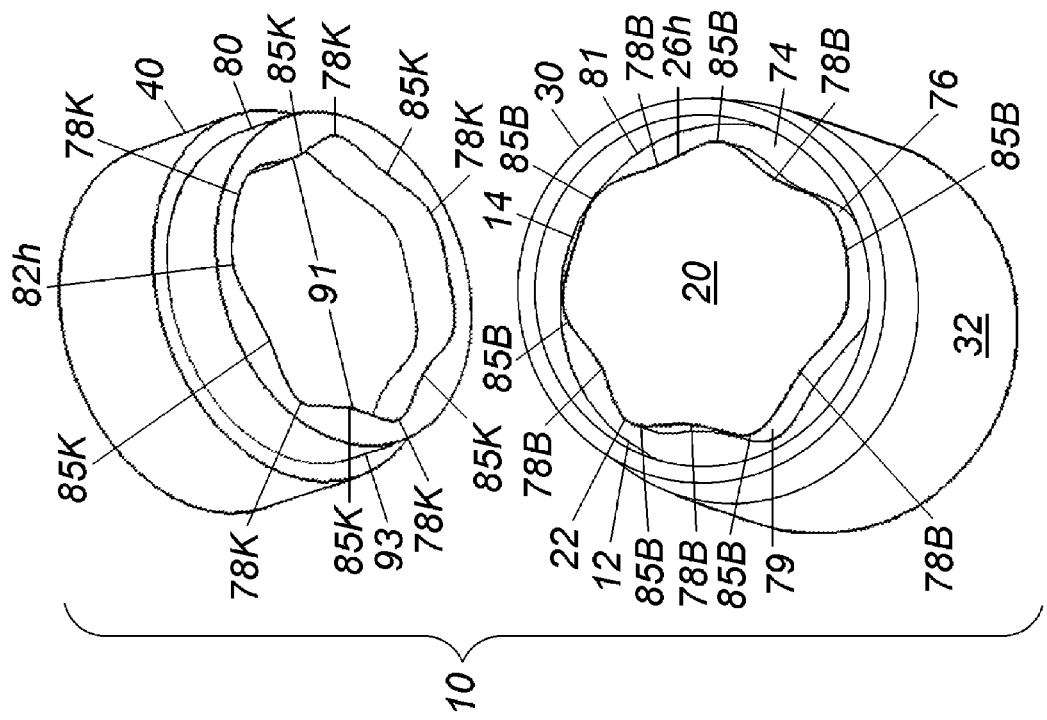

SECURITY KNOB WITH THREADED MEMBER

FIELD OF THE INVENTION

The present invention relates to a security knob, and in particular to a security knob with either female or male threads.

BACKGROUND OF THE INVENTION

Locking security knobs are generally well-known.

One well-known locking-type security knob is the DuraSafe locking knob available from DuraSafe Inc., New Berlin, Wis., United States of America. Such locking-type security knobs are large, cumbersome, expensive to manufacture and are expensive to the purchaser because of an integral lock mechanism at the core.

However, locking-type security knobs are inherently restricted from providing efficient and reliable security without an actual lock mechanism.

SUMMARY OF THE INVENTION

The present invention is a present invention is a security knob threaded with either female or male threads that overcomes limitations of the prior art for securing normally hand-operated threaded knobs.

According to one aspect of the invention, the threaded security knob includes a threaded member having a generally concentric body that defines a central longitudinal axis. The body of the threaded member is formed with a threaded portion along the central axis and positioned adjacent to a first end of the body. The body of the threaded member also includes a key receiver that is formed in a second end of the body opposite of the threaded portion, wherein the key receiver is formed having one of a plurality of different key receiver configurations.

The threaded security knob also includes a slip ring formed with a generally tubular interior side wall that is sized to fit over and extend along the generally concentric body of the threaded member in an inseverable and a relatively concentrically rotational relationship therewith. An interlocking rotational slip mechanism is coupled between the threaded member and the slip ring. A key is included that is formed with one of a plurality of different key configurations each corresponding to a different one of the plurality of different key receiver configurations of the key receiver of the threaded member.

According to another aspect of the invention, the slip ring of the threaded security knob is sized to substantially screen an entire lengthwise extent of the threaded member between the first and second ends thereof.

According to another aspect of the invention, the slip mechanism of the threaded security knob is formed of cooperating rotational slip members that are interlockingly coupled between the threaded member and the slip ring.

According to another aspect of the invention, the slip mechanism of the threaded security knob is formed of a cooperating ring and retention groove that are coupled between the threaded member and the slip ring.

According to another aspect of the invention, the body of the threaded member is formed with the retention groove, and the slip ring is formed with the cooperating ring.

According to another aspect of the invention, the cooperating ring of the slip ring is optionally formed as a split ring.

According to another aspect of the invention, the slip ring is further formed with an interior skirt that is spaced inwardly of an outer screening wall of the slip ring, and the interior skirt is substantially concentric the outer screening wall. According to this aspect of the invention, the interior skirt is formed with the cooperating split ring.

According to another aspect of the invention, the body of the threaded member is formed with the cooperating ring, and the slip ring is formed with the retention groove. According to this aspect of the invention, the retention groove of the slip ring is optionally formed as a split ring. According to this aspect of the invention, when the slip ring is formed with the retention groove, the slip ring is optionally formed with the interior skirt spaced inwardly of the outer screening wall of the slip ring and is substantially concentric therewith, and the interior skirt is formed with the cooperating split ring.

According to another aspect of the invention, the key receiver is further recessed into the second end of the body of the threaded portion.

According to another aspect of the invention, the key receiver is further substantially concentric with the central longitudinal axis of the body of the threaded portion.

According to another aspect of the invention, the threaded portion of the body of the threaded member is either one of a threaded male stud extended from the first end thereof, or a threaded female bore recessed into the first end thereof.

Other aspects of the invention are detailed herein.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein:

FIG. 10 illustrates the security knob of FIG. 1, wherein the threaded member is formed with a key receiver generally aligned along the central axis, wherein the key receiver of each security knob of the invention is formed having a first key receiver configuration of a plurality of different key receiver configurations that cause the security knob to be classified as "tamper-resistant";

FIG. 11 illustrates the security knob of FIG. 1, wherein the key receiver is formed having a second key receiver configuration of the plurality of different key receiver configurations that is different from the first key receiver configuration shown in FIG. 10;

FIG. 14 illustrates the security knob of FIG. 1, wherein the key receiver is formed having a fifth key receiver configuration that is different from all of plurality of different key receiver configurations of the plurality of different key receiver configurations that is different from all of the first key receiver configuration shown in FIG. 10, the second key receiver configuration shown in FIG. 11, the third key receiver configuration shown in FIG. 12, and the fourth key receiver configuration shown in FIG. 13;

FIG. 15 illustrates the security knob of FIG. 1, wherein the key receiver is formed having a sixth key receiver configuration that is different from all of plurality of different key receiver configurations of the plurality of different key receiver configurations that is different from all of the first key receiver configuration shown in FIG. 10, the second key receiver configuration shown in FIG. 11, the third key receiver configuration shown in FIG. 12, the fourth key receiver configuration shown in FIG. 13, and the fifth key receiver configuration shown in FIG. 14;

FIG. 17 illustrates the security knob of FIG. 1, wherein the key receiver is formed having an eighth key receiver configuration that is different from all of plurality of different key receiver configurations of the plurality of different key receiver configurations that is different from all of the first key receiver configuration shown in FIG. 10, the second key receiver configuration shown in FIG. 11, the third key receiver configuration shown in FIG. 12, the fourth key receiver configuration shown in FIG. 13, the fifth key receiver configuration shown in FIG. 14, the sixth key receiver configuration shown in FIG. 15, and the seventh key receiver configuration shown in FIG. 16; and FIG. 18 illustrates the security knob of FIG. 1, wherein the key receiver is formed having a ninth key receiver configuration that is different from all of plurality of different key receiver configurations of the plurality of different key receiver configurations that is different from all of the first key receiver configuration shown in FIG. 10, the second key receiver configuration shown in FIG. 11, the third key receiver configuration shown in FIG. 12, the fourth key receiver configuration shown in FIG. 13, the fifth key receiver configuration shown in FIG. 14, the sixth key receiver configuration shown in FIG. 15, and the seventh key receiver configuration shown in FIG. 16, and the eighth key receiver configuration shown in FIG. 17.

DETAILED DESCRIPTION OF PREFERRED EMBODIMENT

As required, a detailed illustrative embodiment of the present protective enclosure is disclosed herein. However, techniques, systems and operating structures in accordance with the present protective enclosure may be embodied in a wide variety of forms and modes, some of which may be quite different from those in the disclosed embodiment. Consequently, the specific structural and functional details disclosed herein are merely representative, yet in that regard, they are deemed to afford the best embodiment for purposes of disclosure and to provide a basis for the claims herein which define the scope of the present protective enclosure. The following presents a detailed description of an illustrative embodiment (as well as some alternative embodiments) of the present protective enclosure.

In the Figures, like numerals indicate like elements.

Figure 1:
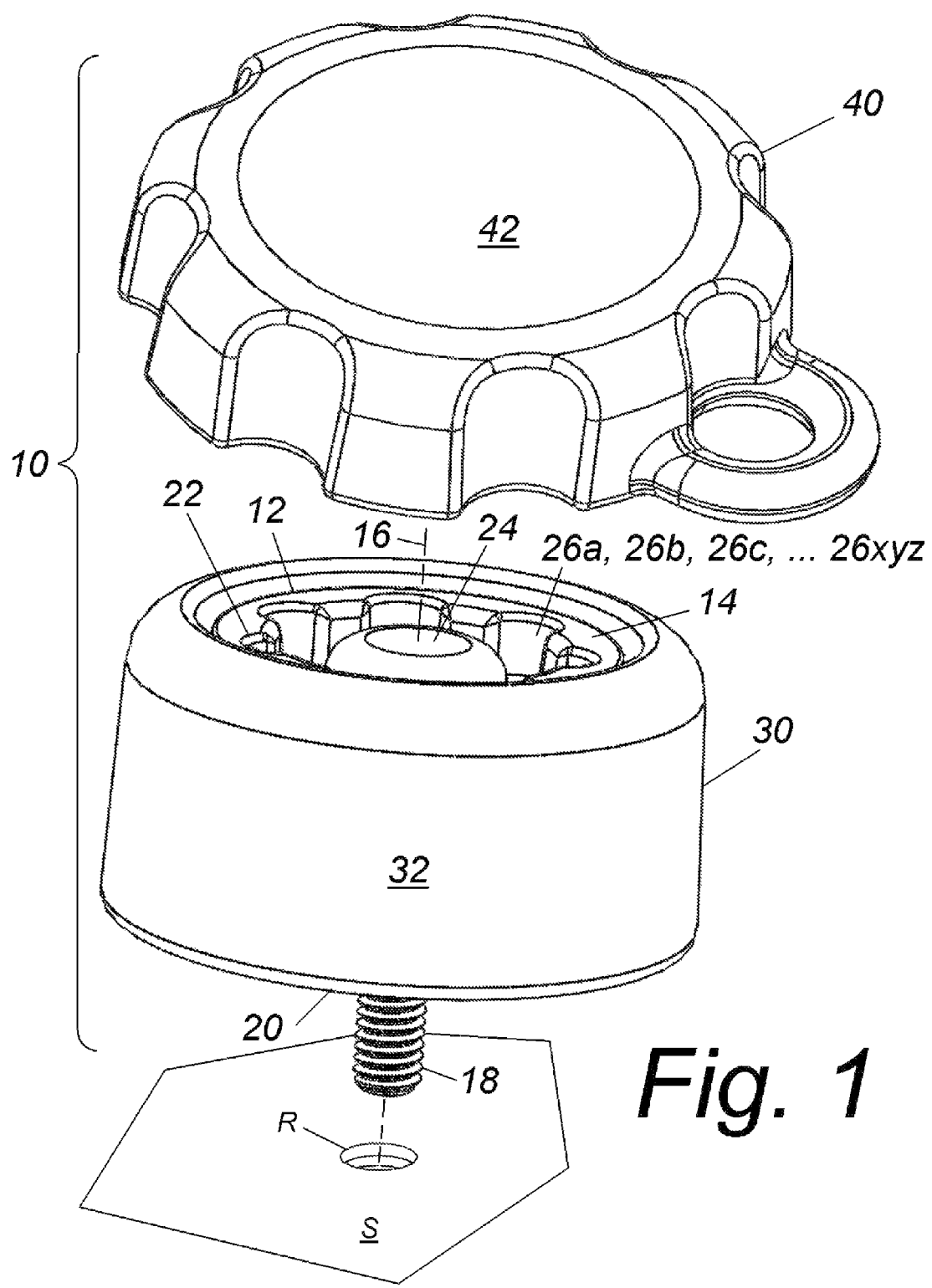
FIG. 1 is a side view that illustrates the invention embodied by example and without limitation as a security knob with either female threads or male threads (shown here) that overcomes limitations of the prior art for securing normally hand-operated locking-type threaded knobs.

FIG. 1 illustrates one embodiment of the invention for securing normally hand-operated threaded knobs, i.e., threaded knobs tightened and loosened by the user's fingers.

FIG. 1 illustrates the invention embodied by example and without limitation as a threaded security knob 10 having a threaded member 12 formed with a generally concentric body 14 that defines a central longitudinal axis 16. Body 14 of threaded member 12 is formed with a threaded portion 18 which is either a female or a male (shown here) threaded portion 18a. Threaded portion 18 is generally aligned along central axis 16 adjacent to a first end 20 of body 14. A key receiver 22 is formed in a second end 24 of body 14 opposite of threaded portion 18 and is generally aligned along central axis 16. Key receiver 22 of each different security knob 10 is formed having any one of a plurality of different key receiver configurations 26a, 26b, 26c, etcetera through 26xyz.

A slip ring 30 of security knob 10 is inseparably mutually rotatably interconnected with body 14 of threaded member 12. As illustrated here, an outer screening wall 32 of slip ring 30 substantially screens an entire longitudinal extent of threaded member 12 between first end 20 and second end 24 thereof.

Manual turning of slip ring 30 causes it to freely spin on body 14 of threaded member 12 in a mutually relatively concentrically rotational slipping relationship therewith.

Accordingly, slip ring 30 protects threaded member 12 from unauthorized access and manipulation when threaded portion 18 is engaged with a target threaded receiver R in a target surface S.

An operating key 40 is formed with an operating handle 42 for turning threaded member 12 when engaged therewith, as discussed herein.

Figure 2:
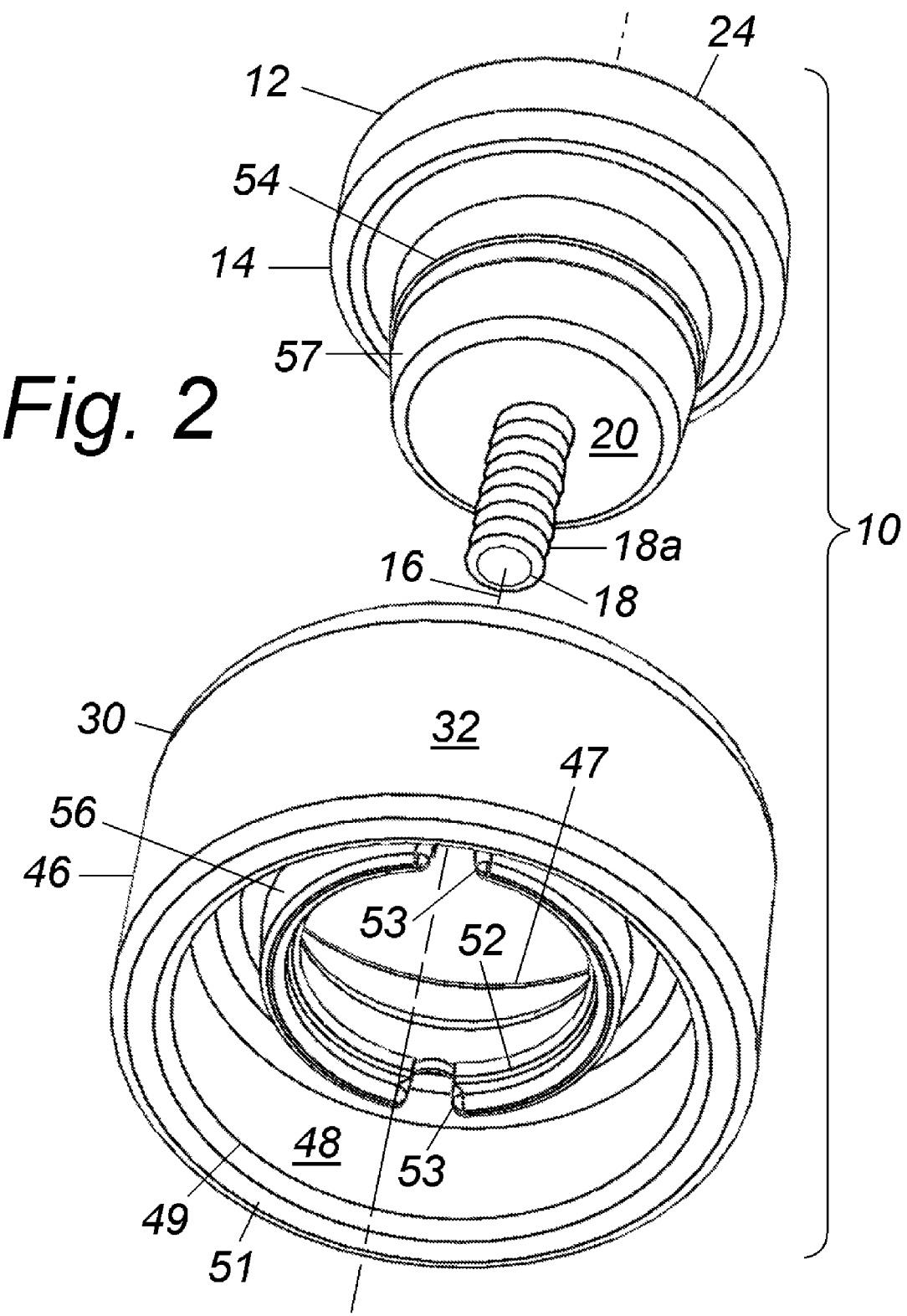
FIG. 2 is a bottom view that illustrates a threaded member of the security knob of FIG. 1 being assembled into a mutually relatively concentrically rotational slipping relationship with a slip ring thereof with an interlocking slip mechanism therebetween.

FIG. 2 is an exploded view of security knob 10 that illustrates threaded member 12 being formed with a male threaded projection 18a. Operating key 40 is omitted.

Here, slip ring 30 is illustrated as being formed of a generally concentric body 46 defining a generally concentric tubular interior side wall 48 having an opening 49 thereinto at a first end 51, wherein opening 49 in first end 51 is sized to fit over and extend substantially entirely along generally concentric body 14 of threaded member 12 when threaded member 12 is assembled with slip ring 30 along common axis 16. A slip mechanism 50 is interlockingly coupled between threaded member 12 and slip ring 30 for conjoining slip ring 30 in a substantially permanently inseparable and the mutually relatively concentrically rotational slipping relationship with threaded member 12. By example and without limitation, slip mechanism 50 resulting in the inseparable relationship of slip ring 30 with body 14 of threaded member 12 is provided by one or more interconnecting mutually rotational slip members 52 and 54 that are concentrically coupled in an interlocking manner between body 14 of threaded member 12 and plug portion 57 of body 46 of slip ring 30.

As illustrated here by example and without limitation, cooperating mutually rotational slip members 52 and 54 that are formed as a cooperating interference ring 52 and retention groove 54 coupled between slip ring 30 and threaded member 12. Here, by example and without limitation, slip ring 30 is formed with interference ring 52, while plug portion 57 of body 14 of threaded member 12 is formed with cooperating retention groove 54. As disclosed here by example and without limitation, cooperating interference ring 52 of slip ring 30 is formed with one or more splits 53, whereby interference ring 52 is split-ring mechanism which causes interference ring 52 to be more flexible for easier assembly with cooperating retention groove 54 of slip mechanism 50. Optionally, body 46 of slip ring 30 is formed with an interior skirt 56 that is spaced inwardly of outer screening wall 32 and substantially concentric therewith, and interior skirt 56 is formed with an aperture 47 sized to receive therethrough plug portion 57 of body 14 of threaded member 12. When present, interior skirt 56 body 46 of slip ring 30 is optionally formed with split ring-type cooperating interference ring 52.

Figure 3:
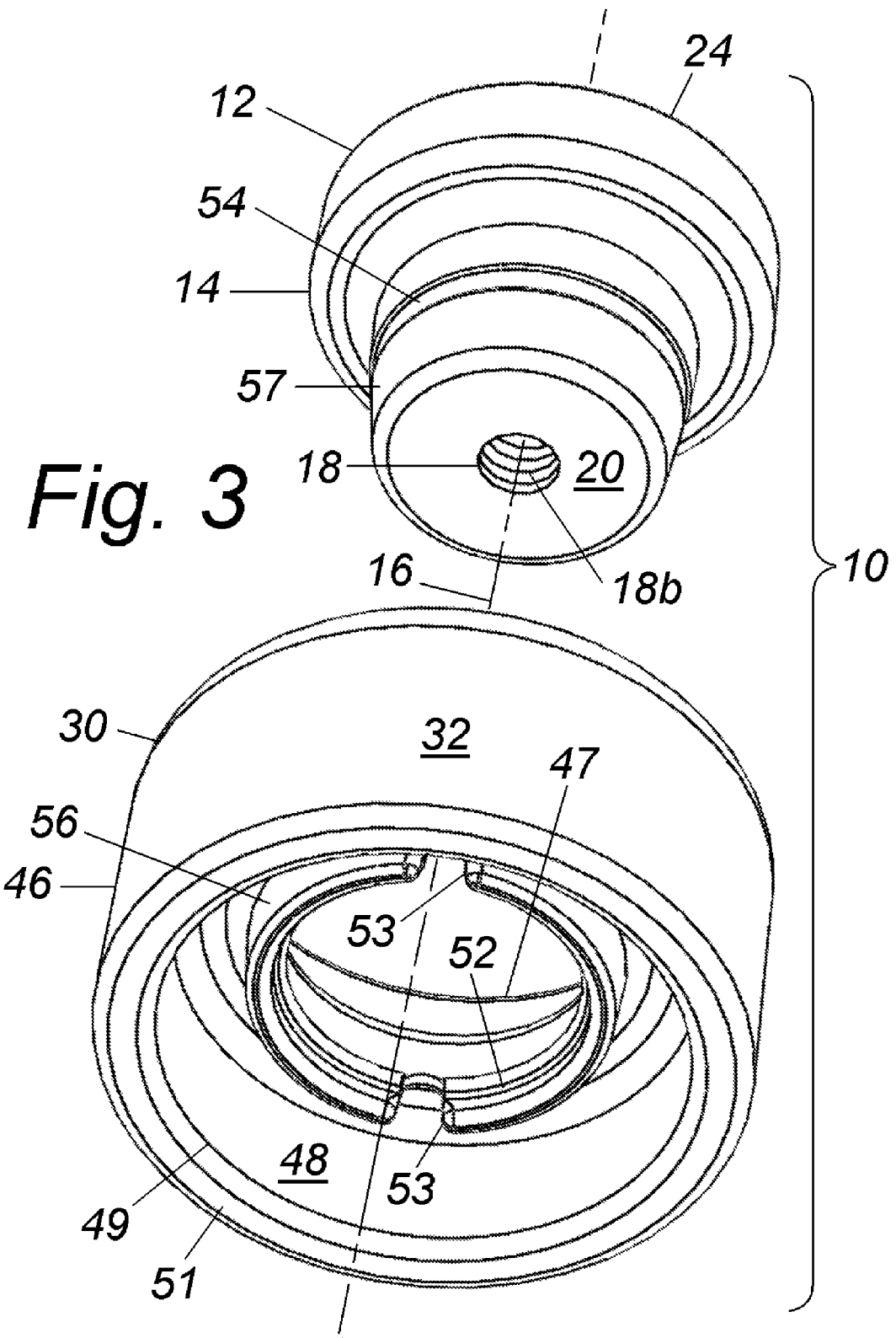
FIG. 3 is a bottom view that illustrates a threaded member of the security knob of FIG. 1 being assembled into a mutually relatively concentrically rotational slipping relationship with a slip ring thereof with an interlocking slip mechanism therebetween, wherein the security knob is shown with female threads, and the interlocking slip mechanism is shown with cooperating mutually rotational slip members that are formed as a cooperating interference ring and a flexibly split retention groove that are inseparably coupled between the threaded member and the slip ring.

FIG. 3 is another exploded view of security knob 10 that illustrates threaded member 12 being formed with a female threaded bore 18b.

Figure 4:
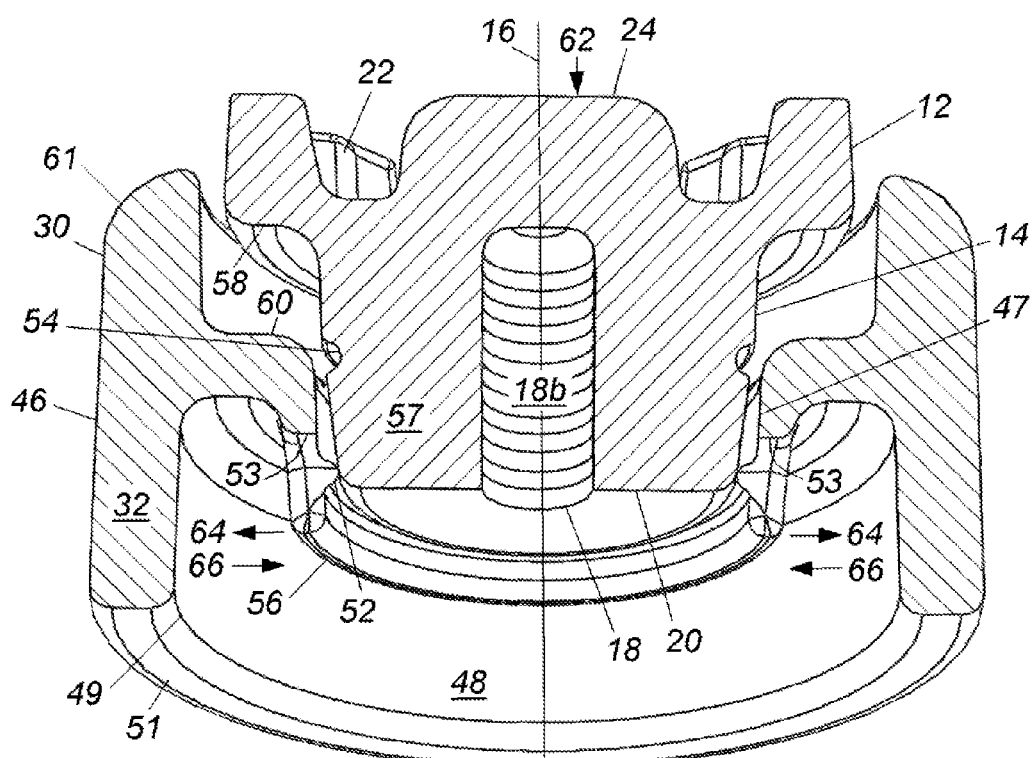
FIG. 4 is a cross-section view that illustrates an initial stage of the threaded member of the security knob of FIG. 1 being assembled into the slip ring thereof.

FIG. 4 illustrates assembly of slip ring 30 with threaded member 12. Here, plug portion 57 of body 14 of threaded member 12 is illustrated as being formed with a slight taper beginning at first end 20 for ease of assembly through aperture 47 formed by interior skirt 56 in body 46 of slip ring 30. Furthermore, body 14 of threaded member 12 is formed with a flange 58 above plug portion 57 adjacent to second end 24 of body 14. Body 46 of slip ring 30 is formed with a shoulder 60 spaced from second end 61 thereof between interior skirt 56 and tubular interior side wall 48 from which interior side wall 48 is suspended.

An assembly compression force (arrow 62) applied along common axis 16 causes plug portion 57 of body 14 of threaded member 12 to generate an expansive force (arrow 64) for forcefully expanding split ring-type interference ring 52 in interior skirt 56 sufficiently to permit cooperating retention groove 54 of slip mechanism 50 to pass over interference ring 52. Thereafter, a restorative compressive spring force (arrow 66) acting opposite of expansion force (arrow 64) causes forcibly expanded interference ring 52 in interior skirt 56 to automatically return to it's original relaxed state, thereby forcefully snapping spread interference ring 52 into cooperating retention groove 54 of threaded member 12. Interior skirt 56 of slip ring body 46 thus operates as a snap ring that flexes to snap retention groove 54 over interference ring 52 in an interference fit that will not separate. Thereafter, interconnecting mutually rotational slip members 52 and 54 are substantially permanently concentrically inseparably coupled in interlocking manner between body 14 of threaded member 12 and body 46 of slip ring 30. However, the ring and groove nature of rotational slip members 52 and 54 result in the mutually relatively concentrically rotational slipping relationship between slip ring 30 and threaded member 12, whereby turning of slip ring 30 causes it to spin on body 14 without turning threaded member 12.

When body 46 of slip ring 30 is formed with an interior skirt 56, as shown, assembly compression force (arrow 62) forces plug portion 57 of body 14 of threaded member 12 through aperture 47 formed by interior skirt 56 in body 46 of slip ring 30. Thereafter, rotational slip members 52 and 54 of slip mechanism 50 are coupled between plug portion 57 of body 14 of threaded member 12 and interior skirt 56 of body 46 of slip ring 30.

Figure 5:
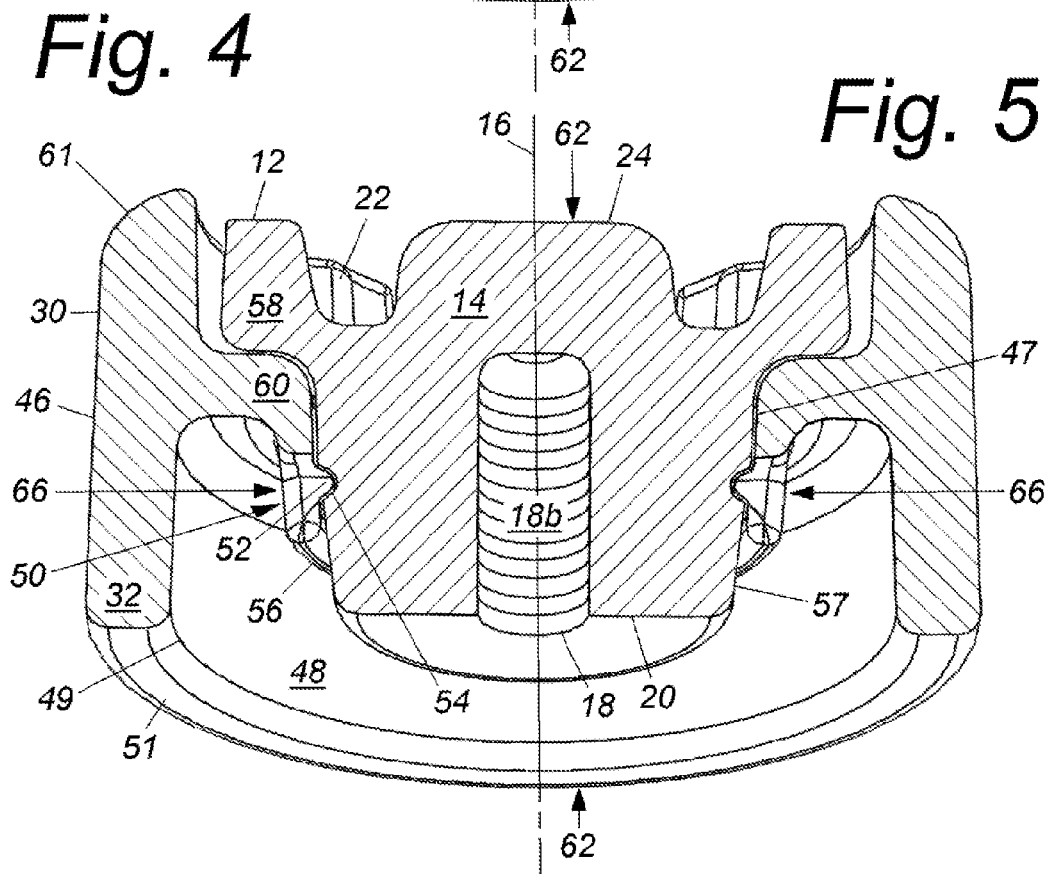
FIG. 5 is another cross-section view that illustrates the threaded member of the security knob of FIG. 1 being completely assembled into the slip ring thereof, wherein a flange of the threaded member cooperates with a shoulder of the slip ring to place the cooperating interference ring and retention groove in position for seating the interference ring into the retention groove, whereby the retention groove snaps over the interference ring under a restorative compressive spring force when the split-ring retention groove of the slip ring body is forced apart to admit the threaded member through the central aperture thereof, and such restorative compressive spring force interlockingly interconnects these cooperating components of the slip mechanism in the substantially permanently inseparable yet mutually relatively concentrically rotational slipping relationship.

FIG. 5 illustrates flange 58 cooperates with shoulder 60 to place cooperating interference ring 52 and retention groove 54 in position for seating interference ring 52 into retention groove 54, whereby retention groove 54 snaps over interference ring 52 when threaded member 12 is forced (arrow 62) into conjoining with slip ring 30 along common axis 16. Accordingly, restorative compressive spring force (arrow 66) of interior skirt 56 of slip ring body 46 forcefully interlockingly interconnects these cooperating components 52 and 54 of slip mechanism 50 in substantially permanently inseparable relationship, while ring and groove nature of rotational slip members 52 and 54 of slip mechanism 50 causes slip ring 30 to assume the mutually relatively concentrically rotational slipping relationship with threaded member 12.

Figure 6:
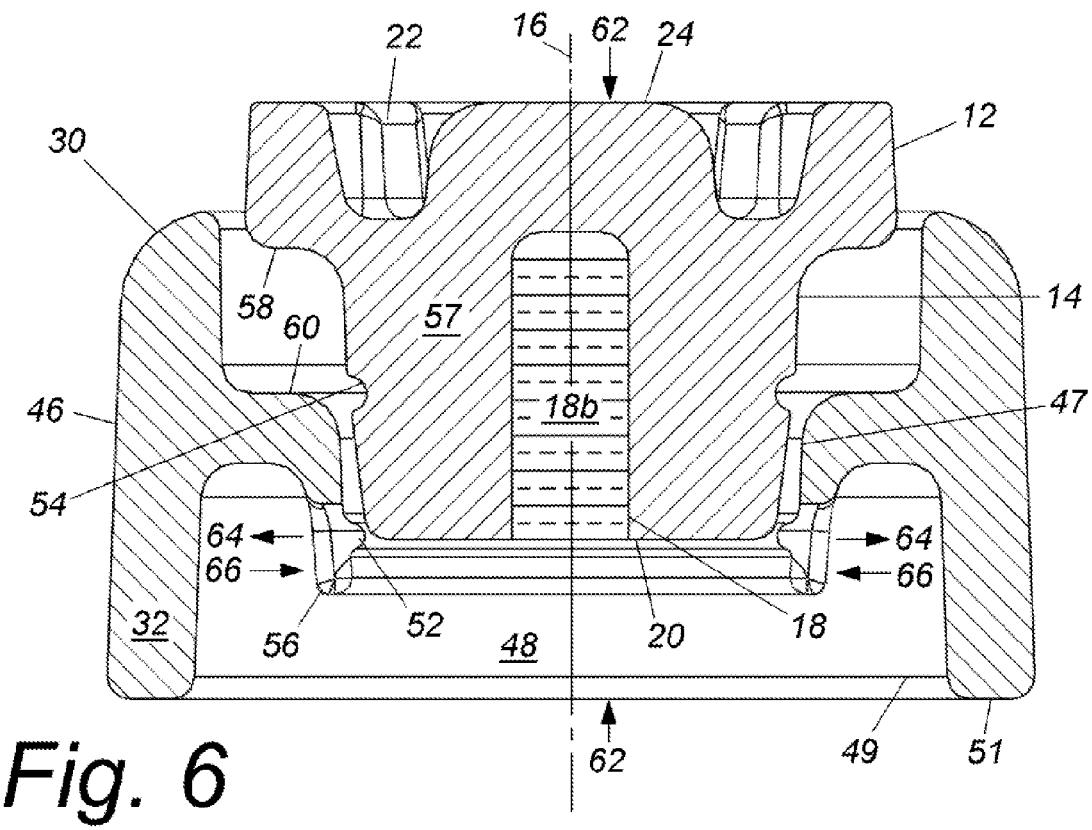
FIG. 6 is a cross-sectional side view that illustrates an initial stage of the threaded member of the security knob of FIG. 1 being assembled into the slip ring thereof, as shown in FIG. 4.

FIG. 6 is a cross-sectional side view that illustrates installation of slip ring 30 with threaded member 12, as shown in FIG. 4.

Figure 7:
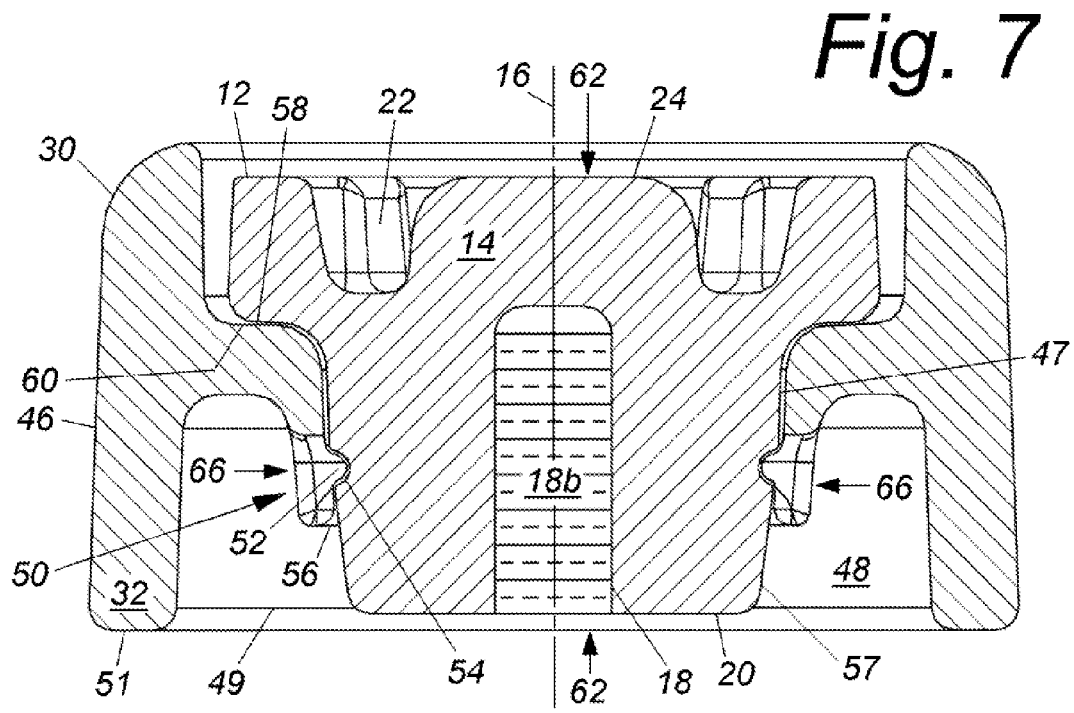
FIG. 7 is another cross-section view that illustrates the threaded member of the security knob of FIG. 1 being completely assembled into the slip ring thereof, as shown in FIG. 5.

FIG. 7 is a cross-sectional side view that illustrates seating of cooperating interference ring 52 into retention groove 54, as shown in FIG. 5.

Figure 8:
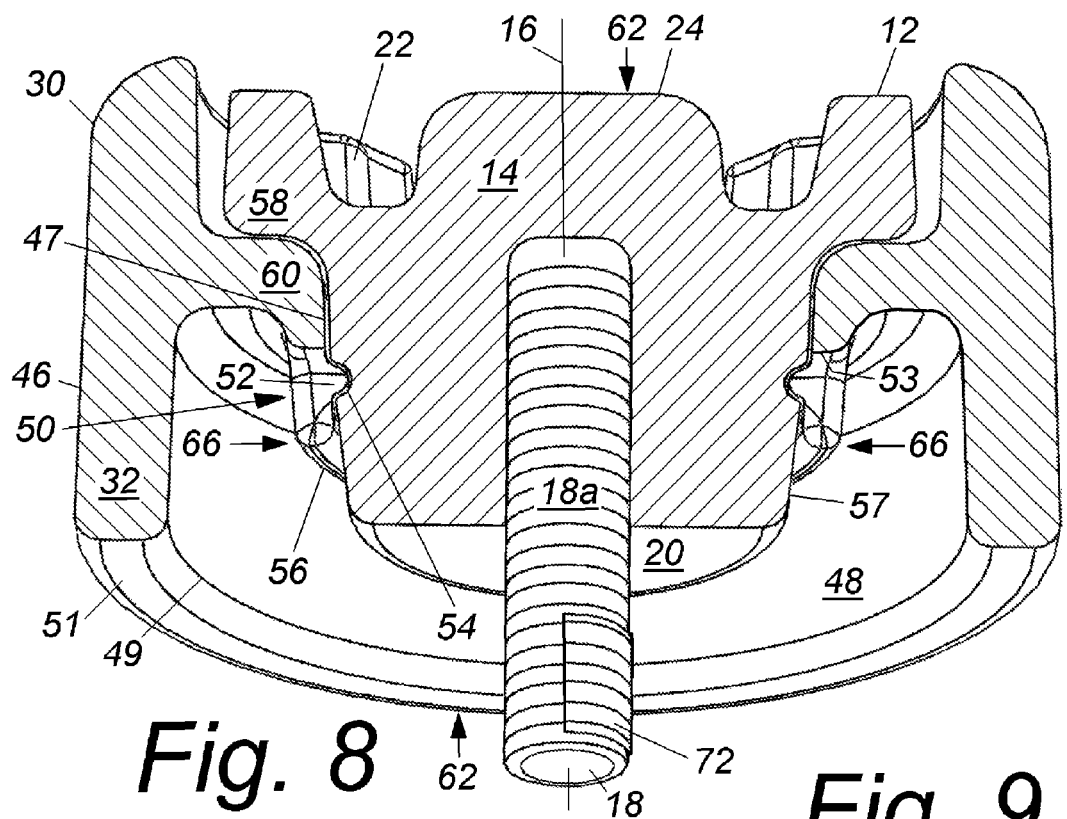
FIG. 8 illustrates the security knob of FIG. 1, wherein the male-type threaded portion of the threaded member is formed with a locking member such as but not limited to a Nyloc or other locking patch or insert.

FIG. 8 illustrates cooperating interference ring 52 seated into retention groove 54 by juxtaposition of cooperating flange 58 of threaded member body 14 with shoulder 60 of slip ring body 46, whereby cooperating components 52 and 54 of slip mechanism 50 are interlockingly interconnected in substantially permanently inseparable relationship for connecting slip ring 30 in the mutually relatively concentrically rotational slipping relationship with threaded member 12.

Here, threaded member 12 is formed with male threaded portion 18a. For example, male threaded portion 18a is a threaded stud that is molded into plug portion 57 of body 14 generally along central axis 16 and extending from first end 20. Additionally, male threaded portion 18a optionally is a locking stud, for example, having locking member 72, such as a nylon or other locking patch or insert, that provides interlocking between male threaded portion 18a and a target female threaded receiver R, whereby male threaded portion 18 is a locking thread. Therefore, the locking thread of male threaded portion 18a combines with the relative rotational slipping relationship of slip ring 30 with threaded member 12 to further inhibit turning of threaded member 12 relative to target threaded receiver R when slip ring 30 is turned.

Figure 9:
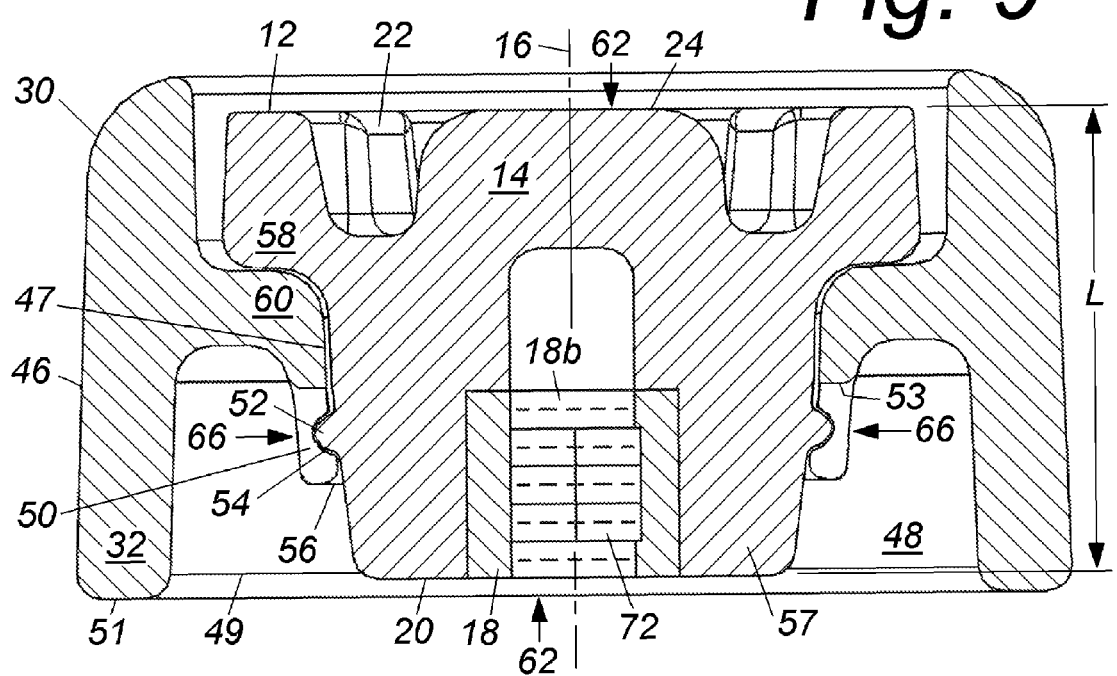
FIG. 9 illustrates the security knob of FIG. 1, wherein the female-type threaded portion of the threaded member is formed with a locking member such as but not limited to a Nyloc or other locking patch or insert, or is formed as another security nut, such as but not limited to a jam nut or other lock nut.

FIG. 9 illustrates assembly force (arrow 62) interconnecting of slip ring 30 with threaded member 12 along common axis 16, which results in juxtaposition of cooperating flange 58 of threaded member body 14 with shoulder 60 of slip ring body 46. Accordingly, cooperating interference ring 52 is forcefully seated into retention groove 54, as disclosed herein, whereby components of slip mechanism 50 are interlockingly interconnected in substantially permanently inseparable relationship for connecting slip ring 30 in the mutually relatively concentrically rotational slipping relationship with threaded member 12.

Here, by example and without limitation, threaded member 12 is formed with interference ring 52, while slip ring 30 is formed with cooperating retention groove 54. Thus, plug portion 57 of body 14 of threaded member 12 is formed with interference ring 52. Retention ring 54 is formed in optional interior skirt 56 of slip ring body 46, when present. Optionally, cooperating retention groove 54 of slip ring 30 is formed as a split ring which makes for easier installation with interference ring 52 on body 14 of threaded member 12.

Assembly force (arrow 62) is applied in direction of common axis 16 for forcefully expanding (arrow 64) split ring-type retention groove 54 in interior skirt 56 sufficiently to permit cooperating interference ring 52 of threaded member 12 to pass into retention groove 54, whereupon a reactive compressive spring force (arrow 66) causes the previously forcibly spread retention groove 54 in interior skirt 56 to return to it's original relaxed state, thereby forcefully snapping spread retention groove 54 over cooperating interference ring 52 of threaded member 12. Thereafter, interconnecting rotational slip members 52 and 54 are substantially permanently concentrically inseparably coupled in interlocking manner between body 14 of threaded member 12 and body 46 of slip ring 30. The ring and groove nature of rotational slip members 52 and 54 results in the mutually relatively concentrically rotational slipping relationship between slip ring 30 and threaded member 12, whereby turning of slip ring 30 causes it to spin on body 14 without turning threaded member 12 relative to target threaded receiver R.

Here, threaded member 12 is formed with female threaded portion 18b that is molded into body 14 generally along central axis 16 and extending from first end 20 thereof. For example, female threaded portion 18b is a threaded nut molded into body 14 adjacent to first end 20. Body 14 of threaded member 12 is formed with clearance bore 70 beyond female threaded nut 18b adjacent to second end 24 thereof for clearance of target threaded screw receiver R. Additionally, female threaded portion 18b optionally is a locking thread. For example, female threaded portion 18b includes a locking member 72, such as a nylon or other locking patch or insert, that provides interlocking between female threaded portion 18b and a target male threaded receiver R, whereby female threaded portion 18b is a locking thread. For example, locking member 72 is provided when female threaded portion 18b is a Nyloc nut, also known as a nylon insert lock nut, polymer insert lock nut or elastic stop nut, which is a kind of nut that includes a nylon collar insert for interlocking with the target male threaded receiver. When utilized as locking female threaded portion 18b, Nyloc nuts retain their locking ability up to 250° F. (121° C.). Nyloc is a registered trade name of Forest Fasteners, The Marmon Group, a Berkshire Hathaway company, Macomb, Mich. 48042-4007. As best understood, plastic insert locking member 72 is placed at the end of nut 18b and its inner diameter (ID) is slightly smaller than the major diameter of the target screw. Plastic insert locking member 72 deforms elastically over the threads of the screw, but threads are not cut into the nylon. Nylon insert locking member 72 locks nut 18b in two ways. First, plastic or nylon locking member 72 forces the bottom face of the screw threads against the top face of the threads of nut 18b, increasing the friction between the two. Second, insert locking member 72 applies a compressive force against the target threaded screw receiver R itself.

Alternatively, locking female threaded portion 18b is another security nut, such as but not limited to a jam nut or other lock nut.

Security knob 10 is a security device in contrast to a locking device. In contrast to a locking device, security knob 10 does not have any locking feature such as a lock requiring a key or combination for release. Rather, security knob 10 operates by outer screening wall 32 of slip ring 30 substantially screening the entire lengthwise extent L of threaded member 12 between first and second ends 20 and 24 thereof. As disclosed herein, the ring and groove nature of rotational slip members 52 and 54 result in the mutually relatively rotational slipping relationship between slip ring 30 and threaded member 12, whereby turning of slip ring 30 causes it to spin on body 14 without turning threaded member 12. Furthermore, slip ring 30 is entrapped by threaded member 12 by shoulder 60 of slip ring 30 being situated between flange 58 of body 14 of threaded member 12 and target surface S when threaded portion 18 is engaged with target threaded receiver R in target surface S, as illustrated in FIG. 1.

Therefore, threaded member 12 can only be manipulated through key receiver 22 in second end 24 of body 14 opposite of threaded portion 18.

FIG. 10 illustrates security knob 10, wherein threaded member 12 is formed with key receiver 22 adjacent to second end 24 of body 14 and generally aligned along central axis 16.

Key receiver 22 of each security knob 10 is formed having any one of a plurality of different key receiver configurations 26a, 26b, 26c, . . . 26xyz, as discussed herein. All different key receiver configurations 26a, 26b, 26c, . . . 26xyz, have in common that none is consistent with a conventional mechanical interface such as, slot or flat drive, Philips, square or Robertson, hex or Allen, Torx, double or triple-square, or other conventional screw drives, including the less common drives generally classified as "tamper-resistant".

FIG. 10 illustrates key receiver 22 being formed with one key receiver configuration 26a of the plurality of different key receiver configurations 26a, 26b, 26c, . . . 26xyz, formed in second end 24 of threaded member body 14 opposite of threaded portion 18, wherein key receiver 22 each of threaded member 12 is formed having one of a plurality of different key receiver configuration 26a, 26b, 26c, . . . 26xyz. By example and without limitation, first key receiver configuration 26a is shown as being a ring-shaped clearance groove 74 recessed into second end 24 of threaded member body 14 around a central hub 76 of body 14 containing either male screw 18a or female nut 18b of threaded member 18. Any plurality (seven shown) of keyways 78 are branched off from clearance 74. Keyways 78 are either uniformly (shown) or nonuniformly distributed around either inner perimeter 79 or outer perimeter 81 of clearance 74.

Operating key 40 is formed with a key projection 80 projected from operating handle 42. Key projection 80 of each key 40 is formed with one of a different key configuration 82a, 82b, 82c, etcetera through 82xyz, with each different key configuration 82a, 82b, 82c, . . . 82xyz being configured to cooperate with a different respective one of different key receiver configurations 26a, 26b, 26c, . . . 26xyz of key receiver 22 of threaded member 12 of different security knobs 10. For example, first key configuration 82a cooperates with first key receiver configuration 26a, second key configuration 82b cooperates with second key receiver configuration 26b, third key configuration 82c cooperates with third key receiver configuration 26c, and this series of combinations of cooperating key configuration 82xyz and key receiver configuration 26xyz continues indefinitely.

Each different key configuration 82a, 82b, 82c, . . . 82xyz of key projection 80 is further configured to be received into respective different cooperating key receiver configurations 26a, 26b, 26c, . . . 26xyz of cooperating key receiver 22 in a mutually relatively nonrotational relationship therewith. Accordingly, each different key configuration 82a, 82b, 82c, . . . 82xyz of key projection 80 engages respective different cooperating key receiver configuration 26a, 26b, 26c, . . . 26xyz of key receiver 22 of different security knobs 10 in a mutually rotationally fixed relationship, whereby turning of key 40 causes simultaneous turning of corresponding threaded member 12, e.g., by operation of handle 42.

Each different key configuration 82a, 82b, 82c, . . . 82xyz of key projection 80 is also structured to be exclusively engageable with a different respective one of different key receiver configurations 26a, 26b, 26c, . . . 26xyz of corresponding key receiver 22.

Furthermore, each different key configuration 82a, 82b, 82c, . . . 82xyz is incompatible with each of the plurality of different key receiver configurations 26b, 26c, 26d . . . 26xyz that are different from the one particular key receiver configuration, e.g., 26a, with which the one particular key configuration, e.g., 82a, is exclusively interchangeable.

Here, for example, first key configuration 82a is formed with a ring 83 sized to be received into clearance 74 of cooperating first key receiver configuration 26a while passing over central hub 76 in second end 24 of threaded member body 14. First key configuration 82a is also formed with a plurality (seven shown) of teeth 85 positioned around ring 83 for being received into keyways 78 that are branched off from clearance 74. Teeth 85 are either uniformly (shown) or nonuniformly distributed around either inner perimeter 91 or outer perimeter 93 of ring 83 to cooperate with keyways 78.

FIG. 10 also illustrates key 40 is optionally formed with a clearance gap 84 between key projection 80 and operating handle 42 for bypassing slip ring 30 when engaged with threaded member 12.

Handle 42 of key 40 is optionally formed with a grip mechanism 86, such as knurling or finger holds, for gripping key 40 for operation thereof. An optional coupler 88 may be provided, such as for a lanyard or a hanger.

FIG. 11 illustrates security knob 10, wherein key receiver 22 of security knob 10 is formed having a second key receiver configuration 26b different from first key receiver configuration 26a shown in FIG. 10. Second key receiver configuration 26b is different from all of plurality of different key receiver configurations 26a, 26c, 26d . . . 26xyz, as discussed herein. Here, key projection 80 of key 40 is formed having a second key configuration 82b different from first key configuration 82a shown in FIG. 10. Second key configuration 82b is different from all of plurality of different key configuration 82a, 82c, 82d . . . 82xyz, as discussed herein. Second key configuration 82b is compatible only with key receiver configuration 26b, and is incompatible with each of the plurality of different key receiver configurations 26a, 26c, 26d . . . 26xyz, that are different from the one particular key receiver configuration, e.g., 26b, with which second particular key configuration 82b is exclusively interengageable. In other words, second key configuration 82b is structured to be exclusively engageable with second key receiver configuration 26b.

Here, by example and without limitation, second key receiver configuration 26b is shown with clearance 74 recessed into second end 24 of threaded member body 14 around central hub 76 of body 14. Any plurality (six shown) of keyways 78 are branched off from clearance 74, and keyways 78 are either uniformly or nonuniformly (shown) distributed around perimeter 81 of clearance 74.

Second key configuration 82b is structured to cooperate with second key receiver configuration 26b. For example, second key configuration 82b is formed with ring 83 sized to be received into clearance 74 of cooperating second key receiver configuration 26b while passing over central hub 76 in second end 24 of threaded member body 14. Second key configuration 82b also includes plurality (six shown) of teeth 85 positioned around ring 83 for being received into keyways 78 that are branched off from clearance 74. Teeth 85 are either uniformly or nonuniformly (shown) distributed around either inner or outer perimeter 93 of ring 83 to cooperate with keyways 78.

Figure 12:
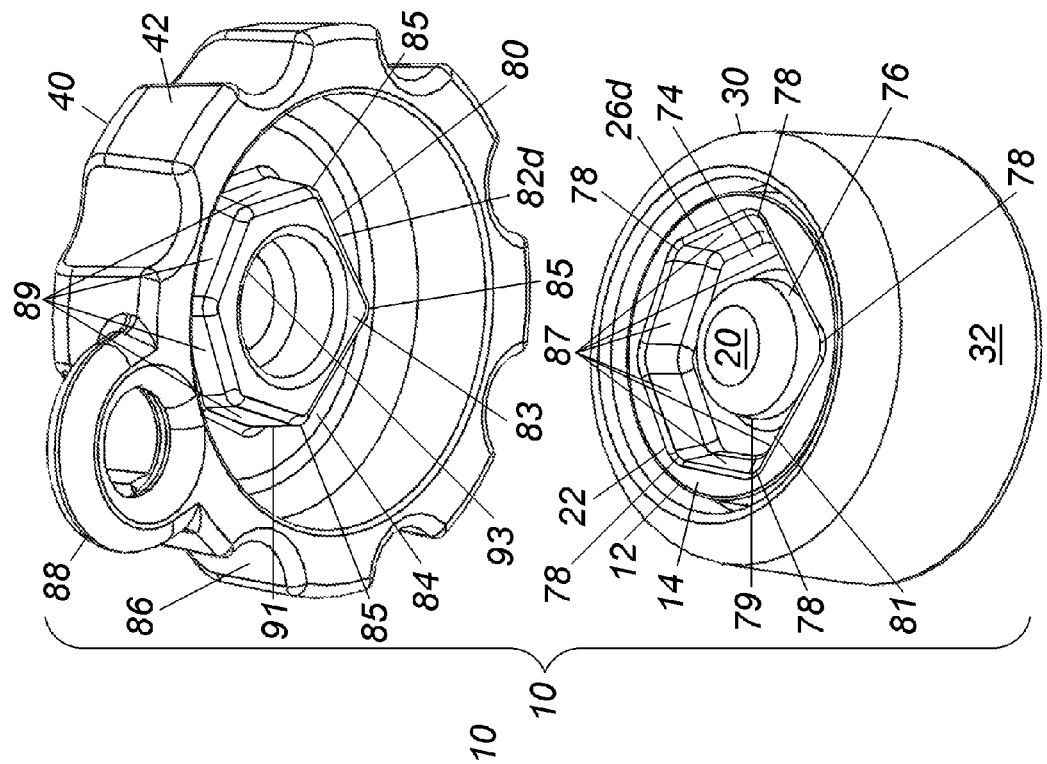
FIG. 12 illustrates the security knob of FIG. 1, wherein the key receiver is formed having a third key receiver configuration of the plurality of different key receiver configurations that is different from the first key receiver configuration shown in FIG. 10, and different from the second key receiver configuration shown in FIG. 11.

FIG. 12 illustrates security knob 10, wherein threaded member 12 is formed with key receiver 22 adjacent to second end 24 of body 14 and generally aligned along central axis 16. Here, key receiver 22 of security knob 10 is formed having a third key receiver configuration 26c different from first key receiver configuration 26a shown in FIG. 10, and different from second key receiver configuration 26b shown in FIG. 11. Third key receiver configuration 26c is also different from all of plurality of different key receiver configurations 26a, 26b, . . . 26xyz, as discussed herein. Third key receiver configuration 26c of key receiver 22 operates in combination with cooperating third key configuration 82c of key projection 80 of key 40.

Third key configuration 82c key projection 80 of key 40 is different from first key configuration 82a shown in FIG. 10, and different from second key configuration 26b shown in FIG. 11. Third key configuration 82c is different from all of plurality of different key configuration 82a, 82b, 82d, . . . 82xyz, as discussed herein. Third key configuration 82c is compatible only with key receiver configuration 26c, and is incompatible with each of the plurality of different key receiver configurations 26a, 26b, 26d, . . . 26xyz, that are different from the one particular key receiver configuration, e.g., 26c, with which third particular key configuration 82c is exclusively interengageable. In other words, third key configuration 82c is structured to be exclusively engageable with third key receiver configuration 26c.

Here, by example and without limitation, third key receiver configuration 26c is shown with clearance 74 recessed into second end 24 of threaded member body 14 around central hub 76 of body 14. Any plurality (seven shown) of flats 87 uniformly distributed around outer perimeter 81 of clearance 74. Plurality (seven shown) of intersections of adjacent flats 87 may be considered plurality of keyways 78 that are branched off from clearance 74, and keyways 78 are either uniformly (shown) or nonuniformly distributed around perimeter 81 of clearance 74.

Third key configuration 82c is structured to cooperate with third key receiver configuration 26c. For example, third key configuration 82c is formed with ring 83 sized to be received into clearance 74 of cooperating third key receiver configuration 26c while passing over central hub 76 in second end 24 of threaded member body 14. Third key configuration 82c is also formed with a plurality (seven shown) of flats 89 positioned around ring 83 for being received into operative juxtaposition with flats 87 of clearance 74. Flats 89 of third key configuration 82c are either uniformly (shown) or nonuniformly distributed around outer perimeter 93 of ring 83 to cooperate with flats 87. Plurality (seven shown) of intersections of adjacent flats 89 may be considered plurality of teeth 85 that are positioned around ring 83 for being received into keyways 78 that are branched off from clearance 74 of third key receiver configuration 26c. Teeth 85 are either uniformly (shown) or nonuniformly distributed around either inner or outer perimeter 93 of ring 83 to cooperate with keyways 78.

Figure 13:
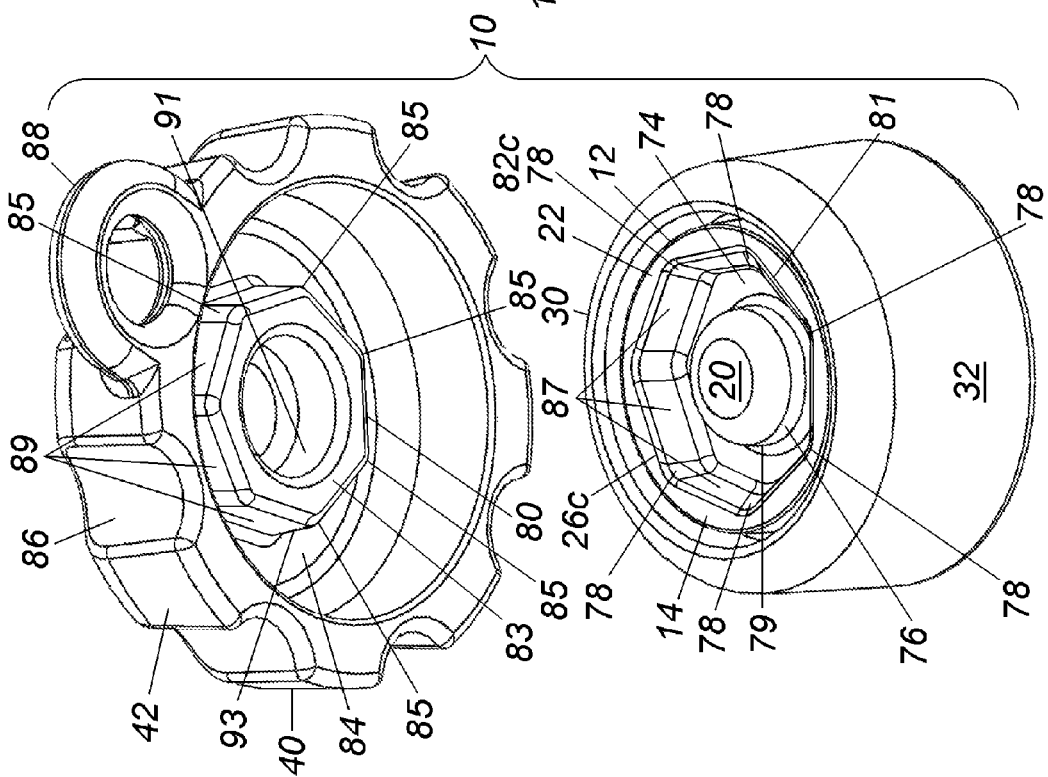
FIG. 13 illustrates the security knob of FIG. 1, wherein the key receiver is formed having a fourth key receiver configuration that is different from all of plurality of different key receiver configurations of the plurality of different key receiver configurations that is different from all of the first key receiver configuration shown in FIG. 10, the second key receiver configuration shown in FIG. 11, and the third key receiver configuration shown in FIG. 12.

FIG. 13 illustrates security knob 10, wherein threaded member 12 is formed with key receiver 22 adjacent to second end 24 of body 14 and generally aligned along central axis 16. Here, key receiver 22 of security knob 10 is formed having a fourth key receiver configuration 26d different from all of plurality of different key receiver configurations 26a, 26b, 26c, . . . 26xyz, as discussed herein. Fourth key receiver configuration 26d of key receiver 22 operates in combination with cooperating fourth key configuration 82d of key projection 80 of key 40.

Fourth key configuration 82d key projection 80 of key 40 is different from all of plurality of different key configuration 82a, 82b, 82c, . . . 82xyz, as discussed herein. Fourth key configuration 82d is compatible only with fourth key receiver configuration 26d, and is incompatible with each of the plurality of different key receiver configurations 26a, 26b, 26c, . . . 26xyz, that are different from the one particular key receiver configuration, e.g., 26d, with which fourth particular key configuration 82d is exclusively interengageable. In other words, fourth key configuration 82d is structured to be exclusively engageable with fourth key receiver configuration 26d.

Here, by example and without limitation, fourth key receiver configuration 26d is shown with clearance 74 recessed into second end 24 of threaded member body 14 around central hub 76 of body 14. Any plurality (six shown) of flats 87 nonuniformly distributed around outer perimeter 81 of clearance 74. Plurality (six shown) of intersections of adjacent flats 87 may be considered plurality of keyways 78 that are branched off from clearance 74, and keyways 78 are either uniformly or nonuniformly (shown) distributed around perimeter 81 of clearance 74.

Fourth key configuration 82d is structured to cooperate with fourth key receiver configuration 26d. For example, fourth key configuration 82d is formed with ring 83 sized to be received into clearance 74 of cooperating fourth key receiver configuration 26d while passing over central hub 76 in second end 24 of threaded member body 14. Fourth key configuration 82d is also formed with a plurality (six shown) of flats 89 positioned around ring 83 for being received into operative juxtaposition with flats 87 of clearance 74. Flats 89 of fourth key configuration 82d are either uniformly or nonuniformly (shown) distributed around outer perimeter 93 of ring 83 to cooperate with flats 87. Plurality (six shown) of intersections of adjacent flats 89 may be considered plurality of teeth 85 that are positioned around ring 83 for being received into keyways 78 that are branched off from clearance 74 of third key receiver configuration 26c. Teeth 85 are either uniformly or nonuniformly (shown) distributed around either inner or outer perimeter 93 of ring 83 to cooperate with keyways 78.

FIG. 14 illustrates security knob 10, wherein key receiver 22 of security knob 10 is formed having a fifth key receiver configuration 26e different from all of plurality of different key receiver configurations 26a, 26b, 26c, 26d . . . 26xyz, as discussed herein. Fifth key configuration 82e is compatible only with fifth key receiver configuration 26e, and is incompatible with each of the plurality of different key receiver configurations 26a, 26b, 26c, 26d . . . 26xyz, that are different from the one particular key receiver configuration, e.g., 26e, with which fifth particular key configuration 82e is exclusively interengageable. In other words, fifth key configuration 82e is structured to be exclusively engageable with fifth key receiver configuration 26e.

Here, by example and without limitation, fifth key receiver configuration 26e is shown with clearance 74 recessed into second end 24 of threaded member body 14 around central hub 76 of body 14. Any plurality (seven shown) of keyways 78 are branched off from clearance 74, and keyways 78 are either uniformly (shown) or nonuniformly distributed around perimeter 81 of clearance 74. Additionally, here keyways 78 of fifth key receiver configuration 26e are optionally formed of a plurality (three shown) of different sizes, such as but not limited to, large keyways 78L, medium keyways 78M, and small keyways 78S, although more or fewer different sizes of keyways 78 are optionally substituted.

Fifth key configuration 82e is structured to cooperate with fifth key receiver configuration 26e. For example, fifth key configuration 82e is formed with ring 83 sized to be received into clearance 74 of cooperating fifth key receiver configuration 26e while passing over central hub 76 in second end 24 of threaded member body 14. Fifth key configuration 82e also includes plurality (seven shown) of teeth 85 positioned around ring 83 for being received into keyways 78 that are branched off from clearance 74. Teeth 85 are either uniformly (shown) or nonuniformly distributed around either inner 91 or outer perimeter 93 of ring 83 to cooperate with keyways 78. Furthermore, teeth 85 of fifth key configuration 82e are sized to be received into corresponding keyways 78 of cooperating fifth key receiver configuration 26e. Accordingly, fifth key configuration 82e includes a plurality (three shown) of different size teeth matched to optional different sized keyways 78, when present. For example, fifth key configuration 82e includes one or more large teeth 85L matched to large keyways 78L, one or more medium teeth 85M matched to medium keyways 78M, and one or more small teeth 85S matched to small keyways 78S.

FIG. 15 illustrates security knob 10, wherein details of threaded member 12, slip ring 30 and operating key 40 are simplified. Here, key receiver 22 of security knob 10 is formed having a sixth key receiver configuration 26f different from all of plurality of different key receiver configurations 26a, 26b, 26c, 26d, 26e, . . . 26xyz, as discussed herein. Sixth key configuration 82f is compatible only with sixth key receiver configuration 26f, and is incompatible with each of the plurality of different key receiver configurations 26a, 26b, 26c, 26d, 26e, . . . 26xyz, that are different from the one particular key receiver configuration, e.g., 26f, with which sixth particular key configuration 82f is exclusively interengageable. In other words, sixth key configuration 82f is structured to be exclusively engageable with sixth key receiver configuration 26f.

Here, by example and without limitation, sixth key receiver configuration 26f is shown with clearance 74 recessed into second end 24 of threaded member body 14 around central hub 76 of body 14. Any plurality (three shown) of keyways 78 are branched off from clearance 74, and keyways 78 are either uniformly (shown) or nonuniformly distributed around perimeter 81 of clearance 74. Additionally, here keyways 78 of sixth key receiver configuration 26f are optionally all formed as large keyways 78L, although more or fewer different sizes Of keyways 78 are optionally substituted.

Sixth key configuration 82f is structured to cooperate with sixth key receiver configuration 26f. For example, sixth key configuration 82f is formed with ring 83 sized to be received into clearance 74 of cooperating sixth key receiver configuration 26f while passing over central hub 76 in second end 24 of threaded member body 14. Sixth key configuration 82f also includes plurality (three shown) of large teeth 85L positioned around ring 83 for being received into large keyways 78L and are sized to match therewith.

Handle 42 of key 40 is optionally formed with a grip mechanism 86, shown as knurling, for gripping key 40 for operation thereof. Optional coupler 88 may be provided, such as for a lanyard or a hanger.

Figure 16:
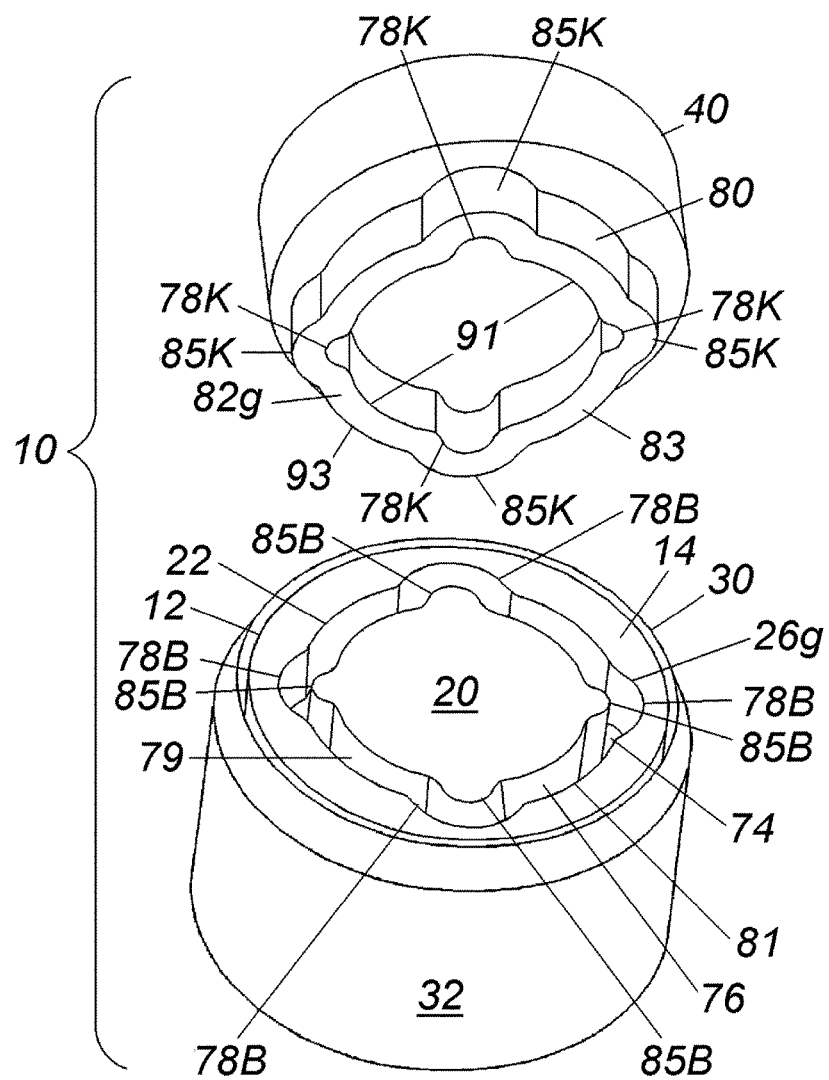
FIG. 16 illustrates the security knob of FIG. 1, wherein the key receiver is formed having a seventh key receiver configuration that is different from all of plurality of different key receiver configurations of the plurality of different key receiver configurations that is different from all of the first key receiver configuration shown in FIG. 10, the second key receiver configuration shown in FIG. 11, the third key receiver configuration shown in FIG. 12, the fourth key receiver configuration shown in FIG. 13, the fifth key receiver configuration shown in FIG. 14, and the sixth key receiver configuration shown in FIG. 15.

FIG. 16 illustrates security knob 10, wherein details of threaded member 12, slip ring 30 and operating key 40 are omitted. Here, key receiver 22 of security knob 10 is formed having a seventh key receiver configuration 26g different from all of plurality of different key receiver configurations 26a, 26b, 26c, 26d, 26e, 26f, . . . 26xyz, as discussed herein. Seventh key configuration 82g is compatible only with seventh key receiver configuration 26g, and is incompatible with each of the plurality of different key receiver configurations 26a, 26b, 26c, 26d, 26e, 26f, . . . 26xyz, that are different from the one particular key receiver configuration, e.g., 26g, with which seventh particular key configuration 82g is exclusively interengageable. In other words, seventh key configuration 82g is structured to be exclusively engageable with seventh key receiver configuration 26g.

Here, by example and without limitation, seventh key receiver configuration 26g is shown with clearance 74 recessed into second end 24 of threaded member body 14 around central hub 76 of body 14. Any plurality (four shown) of keyways 78 and any plurality (four shown) of teeth 85 are branched off from clearance 74 are either uniformly (shown) or nonuniformly distributed around circumference of clearance 74. Additionally, here keyways 78 of seventh key receiver configuration 26f are optionally formed as exterior keyways 78B and in combination with interior teeth 85B. Alternatively, more or fewer different quantities of exterior keyways 78B and interior teeth 85B are optionally substituted. As illustrated, exterior keyways 78B are formed on outer perimeter 81 of recessed clearance 74, and interior teeth 85B are formed on inner perimeter 79 of clearance 74.

Seventh key configuration 82g is structured to cooperate with seventh key receiver configuration 26g. For example, seventh key configuration 82g is formed with ring 83 sized to be received into clearance 74 of cooperating seventh key receiver configuration 26g while passing over central hub 76 in second end 24 of threaded member body 14. Seventh key configuration 82g also includes both a plurality (four shown) of exterior teeth 85K positioned around outer perimeter 93 of ring 83 and sized for being received into exterior keyways 78B in combination with a plurality (four shown) of interior keyways 78K that are positioned around inner perimeter 91 of ring 83 and sized for receiving thereinto exterior teeth 85B.

FIG. 17 illustrates security knob 10, wherein key receiver 22 of security knob 10 is formed having a eighth key receiver configuration 26h different from all of plurality of different key receiver configurations 26a, 26b, 26c, 26d, 26e, 26f, 26g, . . . 26xyz, as discussed herein. Eighth key configuration 82h is compatible only with eighth key receiver configuration 26h, and is incompatible with each of the plurality of different key receiver configurations 26a, 26b, 26c, 26d, 26e, 26f, 26g, . . . 26xyz, that are different from the one particular key receiver configuration, e.g., 26h, with which eighth particular key configuration 82h is exclusively interengageable. In other words, eighth key configuration 82h is structured to be exclusively engageable with eighth key receiver configuration 26h.

Here, by example and without limitation, eighth key receiver configuration 26h is shown with clearance 74 recessed into second end 24 of threaded member body 14 around central hub 76 of body 14. Inner perimeter 79 of clearance 74, which is around central hub 76 of body 14, includes any freeform shape, as illustrated. By example and without limitation, freeform shape of inner perimeter 79 of clearance 74 is formed with a plurality of interior keyways 78B and interior teeth 85B.

Outer perimeter 81 of clearance 74 optionally includes one or more exterior keyways 78B and/or exterior teeth 85B, for example as disclosed in FIG. 18. However, outer perimeter 81 of clearance 74 may be substantially circular, as shown here.

Eighth key configuration 82h is structured to cooperate with eighth key receiver configuration 26h. For example, eighth key configuration 82h is formed with ring 83 sized to be received into clearance 74 of cooperating seventh key receiver configuration 26h while passing over central hub 76 in second end 24 of threaded member body 14. Eighth key configuration 82h also includes inner perimeter 91 of ring 83 being formed with a freeform shape, as illustrated, matched to freeform shape of inner perimeter 79 of clearance 74. Accordingly, freeform shape of inner perimeter 91 of ring 83 is configured to cooperate with freeform shape of inner perimeter 79 of clearance 74 in a mutually relatively non-rotational relationship therewith. Thus, freeform eighth key configuration 82h of key projection 80 engages corresponding eighth key receiver configuration 26h of key receiver 22 of security knob 10 in a mutually rotationally fixed relationship, whereby turning of key 40 causes simultaneous turning of corresponding threaded member 12, e.g., by operation of key handle 42.

By example and without limitation, when freeform shape of inner perimeter 79 of clearance 74 is formed with a plurality of interior keyways 78B and interior teeth 85B, freeform shape of inner perimeter 91 of ring 83 is configured coordinating interior keyways 78K and interior teeth 85K sized to received into interior keyways 78B and interior teeth 85B of central hub 76 of body 14 in a mutually relatively nonrotational relationship therewith.

When outer perimeter 81 of clearance 74 optionally includes one or more interior keyways 78B and/or interior teeth 85B, outer perimeter 93 of ring 83 is configured with coordinating exterior keyways 78K and exterior teeth 85K sized to received into such interior keyways 78B and/or interior teeth 85B in a mutually relatively nonrotational relationship therewith.

However, when outer perimeter 81 of clearance 74 may be substantially circular, as shown here, outer perimeter 93 of ring 83 is configured with coordinating substantially circular shape.

FIG. 18 illustrates security knob 10, wherein key receiver 22 of security knob 10 is formed having a ninth key receiver configuration 26i different from all of plurality of different key receiver configurations 26a, 26b, 26c, 26d, 26e, 26f, 26g, 26h, . . . 26xyz, as discussed herein. Ninth key configuration 82i is compatible only with ninth key receiver configuration 26i, and is incompatible with each of the plurality of different key receiver configurations 26a, 26b, 26c, 26d, 26e, 26f, 26g, 26h, . . . 26xyz, that are different from the one particular key receiver configuration, e.g., 26i, with which ninth particular key configuration 82i is exclusively interengageable. In other words, ninth key configuration 82i is structured to be exclusively engageable with ninth key receiver configuration 26i.

Here, by example and without limitation, ninth key receiver configuration 26i is shown with clearance 74 recessed into second end 24 of threaded member body 14 around central hub 76 of body 14. Outer perimeter 81 of clearance 74 includes any freeform shape, as illustrated. By example and without limitation, freeform shape of outer perimeter 81 of clearance 74 is formed with a plurality of interior keyways 78B and interior teeth 85B.

Inner perimeter 79 of clearance 74 optionally includes one or more exterior keyways 78B and/or exterior teeth 85B, for example as disclosed in FIG. 17. However, inner perimeter 79 of clearance 74 may be substantially circular, as shown here.

Ninth key configuration 82i is structured to cooperate with ninth key receiver configuration 26i. For example, ninth key configuration 82i is formed with ring 83 sized to be received into clearance 74 of cooperating seventh key receiver configuration 26h while passing over central hub 76 in second end 24 of threaded member body 14. Ninth key configuration 82i also includes outer perimeter 93 of ring 83 being formed with a freeform shape, as illustrated, matched to freeform shape of outer perimeter 81 of clearance 74. Accordingly, freeform shape of outer perimeter 93 of ring 83 is configured to cooperate with freeform shape of outer perimeter 81 of clearance 74 in a mutually relatively nonrotational relationship therewith. Thus, freeform ninth key configuration 82i of key projection 80 engages corresponding ninth key receiver configuration 26i of key receiver 22 of security knob 10 in a mutually rotationally fixed relationship, whereby turning of key 40 causes simultaneous turning of corresponding threaded member 12, e.g., by operation of key handle 42.

By example and without limitation, when freeform shape of outer perimeter 81 of clearance 74 is formed with a plurality of interior keyways 78B and interior teeth 85B, freeform shape of outer perimeter 93 of ring 83 is configured coordinating interior keyways 78K and interior teeth 85K sized to received into interior keyways 78B and interior teeth 85B of outer perimeter 81 of clearance 74 in a mutually relatively nonrotational relationship therewith.

When inner perimeter 79 of clearance 74 optionally includes one or more interior keyways 78B and/or interior teeth 85B, inner perimeter 91 of ring 83 is configured with coordinating exterior keyways 78K and exterior teeth 85K sized to received into such interior keyways 78B and/or interior teeth 85B in a mutually relatively nonrotational relationship therewith.

However, when inner perimeter 79 of clearance 74 may be substantially circular, as shown here, inner perimeter 91 of ring 83 is configured with cooperating substantially circular shape.

Additional alternative cooperating embodiments of different key receiver configurations 26j . . . 26xyz of key receiver 22 and key configurations 82j . . . 82xyz of key projection 80 are also contemplated and are within the skill of one of ordinary skill in the art to which the instant invention pertains in light of the instant disclosure and may be substituted without deviating from the scope and intent of the present invention.

While the preferred and additional alternative embodiments of the invention have been illustrated and described, it will be appreciated that various changes can be made therein without departing from the spirit and scope of the invention. Therefore, it will be appreciated that various changes can be made therein without departing from the spirit and scope of the invention. Accordingly, the inventor makes the following claims.

What is claimed is:

1. A threaded security knob, comprising:
a threaded member comprising a generally concentric body defining a central longitudinal axis, the body comprising a threaded portion along the central axis adjacent to a first end of the body, a key receiver disposed along a second end of the body opposite of the threaded portion, wherein the key receiver has a key receiver configuration selected from a plurality of different key receiver configurations, and a flange positioned between the first and second ends;
a slip ring flexibly disposed around at least the key receiver of the threaded member and comprising a generally tubular interior side wall sized to fit over and extend along the generally concentric body of the threaded member in an inseparable, concentrically rotational relationship with the threaded member and the slip ring jointly defining an interlocking rotational slip mechanism, and wherein the slip ring completely surrounds an entire lengthwise extent of the body of the threaded member from the first end thereof to the second end thereof while substantially an entire surface of the second end of the body of the threaded member is simultaneously exposed within an opening in one end of the slip ring, the slip ring further comprising a shoulder therewithin positioned for mating with the flange of the threaded member; and
a key comprising a key configuration selected from a plurality of different key configurations and corresponding to the key receiver configuration of the threaded member.

2. The threaded security knob of claim 1, wherein the slip mechanism comprises cooperating rotational slip members interlockingly coupled.

3. The threaded security knob of claim 2, wherein the rotational slip members comprise a cooperating ring and a retention groove.

4. The threaded security knob of claim 3, wherein the body of the threaded member comprises the retention groove, and the slip ring comprises the cooperating ring.

5. The threaded security knob of claim 4, wherein the cooperating ring of the slip ring is a split ring.

6. The threaded security knob of claim 5, wherein the slip ring comprises an outer screening wall and an interior skirt spaced inwardly of the outer screening wall of the slip ring and concentric therewith, and wherein the interior skirt comprises the cooperating split ring.

7. The threaded security knob of claim 3, wherein the body of the threaded member comprises the cooperating ring, and the slip ring comprises the retention groove.

8. The threaded security knob of claim 7, wherein the retention groove of the slip ring is a split ring.

9. The threaded security knob of claim 8, wherein the slip ring comprises an outer screening wall and an interior skirt spaced inwardly of the outer screening wall of the slip ring and concentric therewith, and wherein the interior skirt comprises the cooperating split ring.

10. The threaded security knob of claim 1, wherein the key receiver is recessed into the second end of the body of the threaded portion.

11. The threaded security knob of claim 1, wherein the external flange of the threaded portion further cooperates with the internal shoulder of the slip ring for placing the interlocking rotational slip mechanism in the inseparable, concentrically rotational relationship of the slip ring and the threaded member.

12. The threaded security knob of claim 1, wherein the threaded portion of the body of the threaded member comprises one of a threaded male stud extended from the first end of the body or a threaded female bore recessed into the first end of the body.

13. The threaded security knob of claim 1, wherein the slip ring extends beyond at least one of the first and second ends of the lengthwise extent of the body of the threaded member.

14. The threaded security knob of claim 1, wherein, when the threaded portion of the threaded member is engaged with a target threaded receiver in a target surface, manual turning of the slip ring causes the slip ring to freely spin on the body of the threaded member in a relatively freely slipping relationship therewith.

15. The threaded security knob of claim 1, wherein each of the plurality of different key receiver configurations of the threaded member is selected from a plurality of different key configurations that are not consistent with a conventional mechanical interface.

16. A threaded security knob, comprising:
a threaded member comprising a generally concentric body defining a central longitudinal axis, the body comprising either a male or a female threaded portion along the central axis adjacent to a first end of the body, a key receiver disposed along a second end of the body opposite of the threaded portion, wherein the key receiver has a key receiver configuration selected from a plurality of different key receiver configurations, and an external flange positioned intermediate between the first and second ends thereof;
a slip ring flexibly disposed around at least the key receiver of the threaded member and comprising a generally tubular interior side wall sized to fit over and extend entirely along the generally concentric body of the threaded member in an inseparable, concentrically rotational relationship, the threaded member and the slip ring jointly defining interconnecting rotational slip members, and the slip ring further comprising an internal shoulder positioned intermediate between first and second ends of the interior side wall for cooperating with the external flange of the threaded member when the slip ring and threaded member are conjoined, and wherein a lengthwise extent of the slip ring between first and second ends thereof is greater than a lengthwise extent of the body of the threaded member between the first and second ends thereof, whereby the slip ring completely surrounds the lengthwise extent of the threaded member from the first end thereof to the second end thereof; and
a key comprising a key configuration selected from a plurality of different key configurations and corresponding to the key receiver configuration of the threaded member.

17. The threaded security knob of claim 16, wherein the interconnecting rotational slip members comprise a cooperating ring and a retention groove concentrically coupled in an inseparable, rotational relationship.

18. The threaded security knob of claim 17, wherein the body of the threaded member comprises the retention groove, and the slip ring comprises the cooperating ring.

19. The threaded security knob of claim 18, wherein the cooperating ring of the slip ring is a split ring.

20. The threaded security knob of claim 17, wherein the body of the threaded portion comprises the cooperating ring, and the slip ring comprises the retention groove.

21. The threaded security knob of claim 16, wherein the external flange of the threaded member further cooperates with the internal shoulder of the slip ring for placing the interconnecting rotational slip members in the inseparable, concentrically rotational relationship of the slip ring and the threaded member.

22. The threaded security knob of claim 16, wherein the slip ring further comprises an opening in an end of the generally tubular interior side wall thereof that is disposed adjacent to the key receiver of the threaded member, the opening being sized to expose therein substantially an entire surface of the second end of the body of the threaded member.

23. A threaded security knob, comprising:
a threaded member comprising a generally concentric body defining a central longitudinal axis, the body comprising one of either a male or a female threaded portion aligned along the central axis adjacent to a first end of the body, a key receiver disposed along a second end of the body opposite of the threaded portion, wherein the key receiver has a key receiver configuration selected from a plurality of different key receiver configurations, and an external flange that is positioned between and spaced away from the first and second ends of the threaded member;
a slip ring comprising an outer screening wall and a generally tubular interior wall that is sized to fit over the threaded member and extend entirely along the body of the threaded member with an internal shoulder therein that is positioned between and spaced away from first and second ends thereof, wherein the threaded member and slip ring define a rotational slip mechanism comprising interlocking concentric rotational slip members flexibly coupled in an inseparable, concentrically rotational relationship with the internal shoulder in juxtaposition with the external flange of the threaded member, and wherein a lengthwise extent of the slip ring between the first and second ends thereof is greater than a lengthwise extent of the body of the threaded member between the first and second ends thereof, whereby the slip ring completely screens the entire lengthwise extent of the threaded member from the first end thereof to the second end thereof; and a key comprising a key configuration selected from a plurality of different key configurations and corresponding to the key receiver configuration of the threaded member, wherein each key configuration is exclusively interconnectable with a single one of the plurality of different key receiver configurations.

24. The threaded security knob of claim 23, wherein the external flange of the threaded member further cooperates with the internal shoulder of the slip ring for coupling the rotational slip members of the rotational slip mechanism into the inseparable, concentrically rotational relationship.

25. The threaded security knob of claim 23, wherein the interlocking slip members of the rotational slip mechanism comprise a cooperating ring and a retention groove concentrically coupled in rotational relationship.

26. The threaded security knob of claim 25, wherein the body of the threaded member comprises the retention groove, and the slip ring comprises the cooperating ring.

27. The threaded security knob of claim 26, wherein the cooperating ring of the slip ring is a split ring.

28. The threaded security knob of claim 25, wherein the body of the threaded member comprises the cooperating ring, and the slip ring comprises the retention groove.

29. The threaded security knob of claim 23, wherein the slip ring further comprises a first opening into the generally tubular interior side wall thereof at the first end thereof and a second opening into the generally tubular interior side wall thereof at the second end thereof, the second opening in the slip ring being disposed adjacent to the key receiver of the threaded member, and the second opening being sized to expose therein substantially an entire surface of the second end of the body of the threaded member.

* * * * *